US005248541A

United States Patent [19]

Tilby

[11] Patent Number: 5,248,541

[45] Date of Patent: Sep. 28, 1993

[54] BOARD OF NON-TIMBER HARDWOOD-REPLACEMENT LUMBER

[76] Inventor: Sydney E. Tilby, 989 Wagonwood Crescent, Victoria B.C., Canada, V8X 4M1

[21] Appl. No.: 847,372

[22] Filed: Mar. 6, 1992

[51] Int. Cl.[5] .......................................... B32B 9/04

[52] U.S. Cl. ........................................ 428/106; 428/15; 428/218; 428/113; 428/114; 428/302; 428/535; 428/537.1; 428/528; 428/529; 144/333; 144/3 R; 156/256

[58] Field of Search ..................... 428/537.1, 541, 543, 428/106, 105, 114, 113, 218, 2, 15, 17, 156, 302, 163, 167, 528, 529, 248, 249; 144/333, 3 R; 156/254, 256, 259

[56] References Cited

U.S. PATENT DOCUMENTS

| | | | |
|---|---|---|---|
| 4,025,278 | 5/1977 | Tilby | 425/404 |
| 4,061,819 | 12/1977 | Barnes | 428/294 |
| 4,122,236 | 10/1978 | Holman | 428/453 |
| 4,212,616 | 7/1980 | Tilby | 425/256 |
| 4,232,067 | 11/1980 | Coleman | 428/17 |
| 4,255,477 | 3/1981 | Holman | 428/106 |
| 4,751,131 | 6/1988 | Barnes | 428/215 |
| 4,810,551 | 3/1989 | Chu | 428/106 |
| 4,968,549 | 11/1990 | Smimizu et al. | 428/537.1 |

*Primary Examiner*—P. C. Sluby
*Attorney, Agent, or Firm*—Jansson & Shupe, Ltd.

[57] ABSTRACT

The invention is a board of non-timber hardwood-replacement lumber. The primary constituent is rinds of a grass selected from the group of grasses consisting of sugarcane and sorghum. The board has an integral mass of parallel elongate flattened rinds aligned along the length of the board, parallel to a board surface and joined together by adhesive bonding. A "cant" (from which the boards are made) is also disclosed and like the boards sawed from it, the cant is substantially void-free and of substantially constant density throughout its cross-section. The board is furniture-grade and exhibits grain characteristics very closely similar to natural hardwood.

7 Claims, 4 Drawing Sheets

FIG. 4
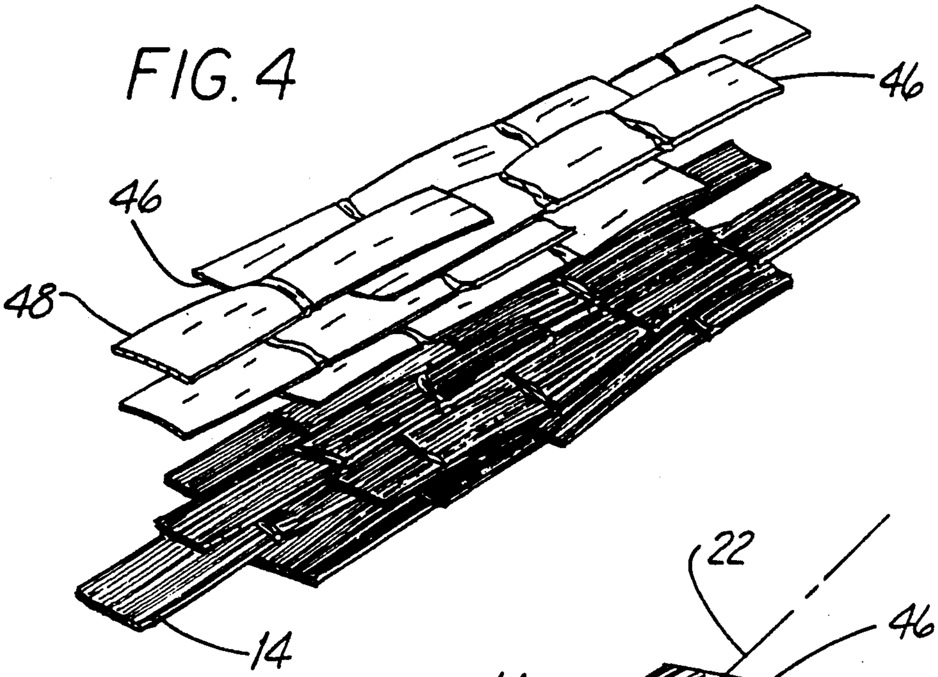
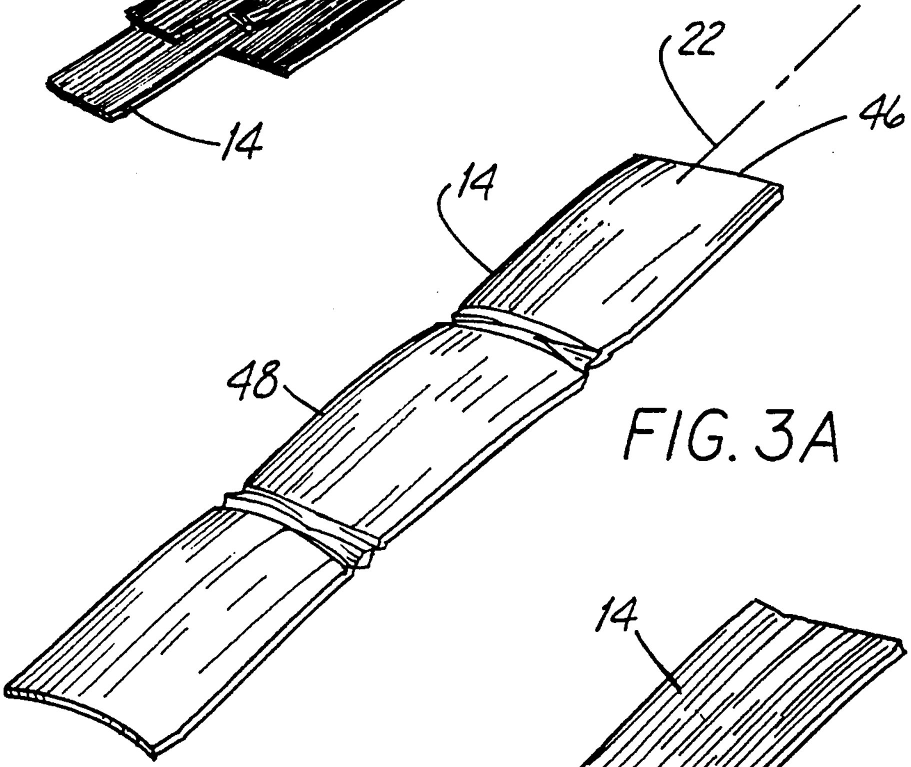
FIG. 3A
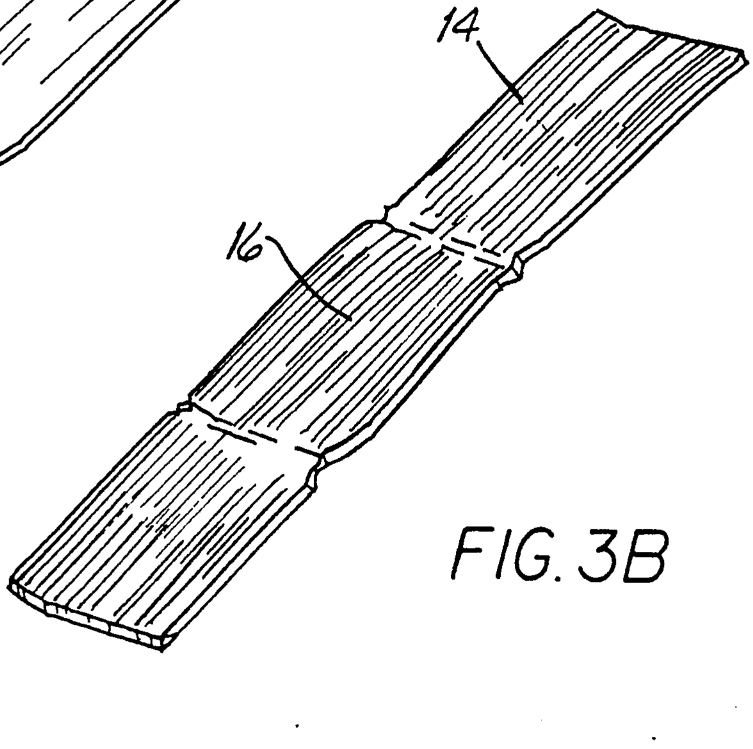
FIG. 3B

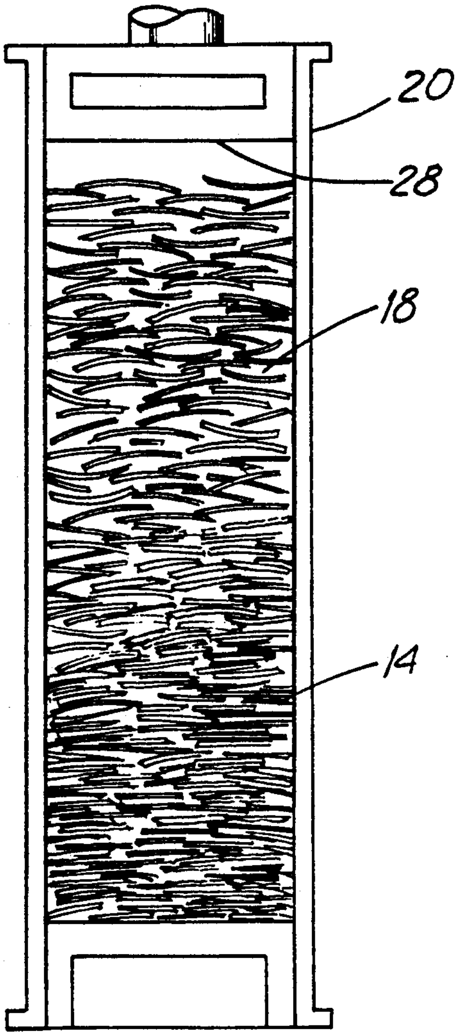
FIG. 5A
FIG. 5B
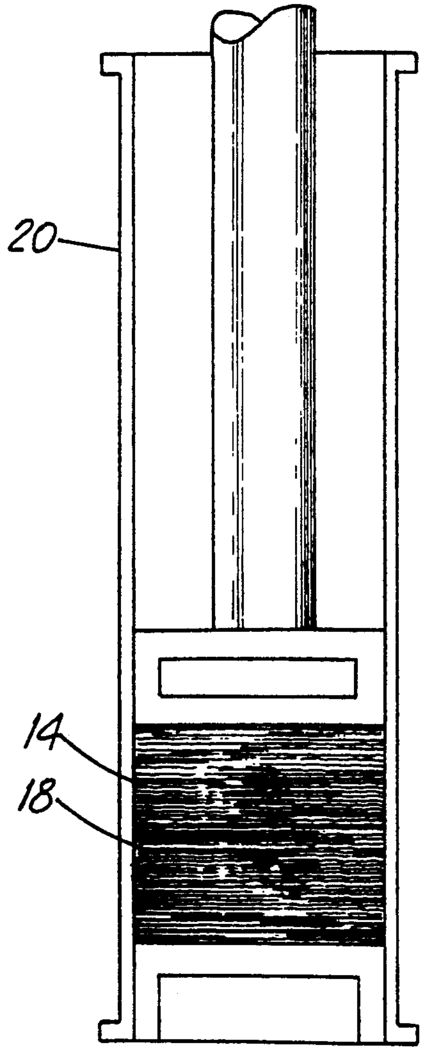
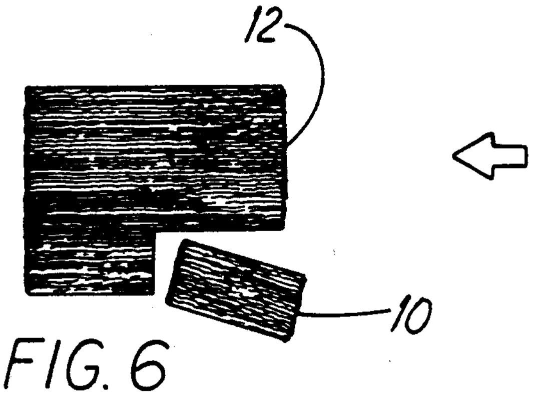
FIG. 6

BOARD OF NON-TIMBER HARDWOOD-REPLACEMENT LUMBER

FIELD OF THE INVENTION

This invention is related generally to lumber and, more particularly, to composite boards.

BACKGROUND OF THE INVENTION

Many kinds of board products have been made from plant fibers in the form of chips, slabs, strands, shreds, particles, sawdust, shavings, comminutions, and other fiber forms. Some of such fiber forms, referred to as wafers, are the intentional result or by-product of "fragmenting" logs cut from trees, and are used in composite structural members and various sheet-like panels. Such fragmenting is by waferizing or otherwise reducing such logs into small pieces. Other plant fibers, such as rinds of sugarcane or the like, sawdust or other non-wafer particles from trees, and other forms, have been contemplated for use in various composite boards, in particular, thin sheet-like panelling.

Such fiber materials are bound together using a variety of binders and forming methods to produce boards of various kinds. Commonly, such boards, including composite lumber, are used in applications where they are concealed from view in the final finished product, e.g., a building.

Long-standing problems or shortcomings of certain "manufactured" boards include their softness and that they are not substantially free of voids and do not have the smooth, relatively hard, substantially void-free surfaces required of furniture-grade lumber. Prior to the invention, ornamental building components and furniture (except furniture of veneered particle board) have used virgin pieces of wood, e.g., walnut, oak, cherry and the like.

Another problem with many of such boards is that their exposed surfaces are distinctly unattractive. They often have visual and/or physical imperfections such as voids, chips, knots or the like. The presence of significant voids is a very real problem in boards made with wafers, at least those made at typical board-making pressures. And even when the product is devoid of such imperfections, the aesthetic quality of the exposed surfaces are unacceptable for furniture, exposed ornamental construction and the like.

In the prior art there is a lack of composite lumber all the surfaces of which, including the flat main surfaces, the edge surfaces and the end surfaces, have appearances closely replicating the corresponding surfaces of natural lumber.

Yet another disadvantage is that, often, such boards tend to splinter when formed by bending. For that reason, they cannot readily be used in, for example, applications requiring bowed components.

Still another disadvantage is that such boards consume timber, albeit scraps and pieces of such timber which might otherwise go to waste. Timber is a precious resource that is replaceable only over years or decades, and deforestation problems are a principal global concern at the end of the twentieth century.

In summary, there is a clear need for non-timber hardwood-replacement lumber which has a high quality surface finish, satisfactory hardness, is substantially devoid of imperfections, can be bent to shapes, has a grain structure very closely simulating that of wood, and which also reduces deforestation concerns.

OBJECTS OF THE INVENTION

It is an object of this invention to provide boards of non-timber hardwood-replacement lumber overcoming some of the problems and shortcomings of boards of the prior art.

Another object of this invention is to provide boards of non-timber hardwood-replacement lumber having a smooth surface finish.

Still another object of this invention is to provide boards of non-timber hardwood-replacement lumber having an aesthetically-attractive exposed surface.

Another object of this invention is to provide boards of non-timber hardwood-replacement lumber having an appearance closely simulating the grain structure of wood.

Yet another object of this invention is to provide boards of non-timber hardwood-replacement lumber which conserves timber resources.

Another object of this invention is to provide boards of non-timber hardwood-replacement lumber which can be shaped by bending.

Another object of this invention is to provide boards of non-timber hardwood-replacement lumber having a hardness like that of furniture-grade lumber.

Still another object of this invention is to provide a non-timber cant (resembling a cant of wood) which can be sawed into boards of non-timber hardwood-replacement lumber.

These and other important objects will be apparent from the descriptions of this invention which follow.

SUMMARY OF THE INVENTION

One aspect of this invention is a board of non-timber hardwood-replacement lumber. The board (sawed from what is known as a "non-timber cant" described below) is an integral mass of parallel elongate flattened rinds of a grass. The flattened rinds are joined together by adhesive bonding. The grass from which the rinds are taken is selected from the group consisting of sugarcane and sorghum.

Both the non-timber cant and non-timber boards sawed from it are substantially void-free and of substantially constant density throughout their cross-sections. The substantial absence of voids makes such boards suitable for use in furniture-grade and ornamental applications (including flooring) where uniformity of finish on the exposed surface is important.

The board has first and second principal surfaces such as the top and bottom surfaces. In the exemplary instance of a board having a rectangular cross-section, such top and bottom surfaces are parallel to one another.

The board also has first and second side surfaces which, for a board of rectangular cross-section, are parallel to one another and normal to the top and bottom surfaces. And the board has first and second board ends, the distance between which defines the board length.

In a highly preferred embodiment, at least two of the four surfaces (i.e., the principal and side surfaces), including at least one of the principal surfaces, are sawed/milled surfaces. Freqently, three of the surfaces are sawed/milled.

In a preferred board, the rinds are substantially planar and aligned along the length of the board. In the most preferred embodiments, each rind is in a plane parallel to the principal surfaces. As will become more apparent, rinds are arranged in layers and those of different layers are in different planes, but the plane of each layer is parallel to the principal surfaces. Each of the rinds has rind ends and rind edges and is oriented so that its rind ends and rind edges overlap adjacent rinds.

Despite such overlapping, the non-timber boards of this invention are substantially void-free, including along the rind ends and the rind edges. This contrasts sharply with what occurs in composite boards made from wafers, which have substantial voids, particularly in end- and edge-adjacent areas.

Indeed, this invention is based in part on the discovery that if half-billet rinds of sugarcane or sorghum (rather than wafers of wood) are used to make cants and boards, the resulting products are substantially void-free. Furthermore, it has been found that such void-free characteristic is achieved even when the cants are made using compressive pressures similar to those used to make lumber of wafers. While not wanting to be bound by any theoretical considerations, this may be due, or due in part, to the nature of the inside surface of the rind. More specifically, the striated inside surfaces may allow squeezing and "melding" of rinds to substantially eliminate voids, even along overlapping rind ends and rind edges.

The non-timber boards of this invention are preferably of substantially constant density, such density being high.

An understanding of this invention will be aided by an explanation of some aspects of sugarcane processing by what is known as the Tilby method. The Tilby method involves cutting the cane stalk into shorter lengths, called "billets," at least about 6 inches (about 15 cm) long and most preferably about 8-12 inches (about 20-30 cm) long or longer. To gain access to the sugar-bearing pith inside the billets, such billets are split in half lengthwise.

After the pith and outer, wax-like dermax coating are removed, the rind pieces which remain are called half-billet rinds. The rinds used to make the inventive board are preferably half-billet rinds.

In describing the non-timber cant of this invention used to make the non-timber boards of this invention, it will be helpful to understand certain steps in processing a log to make lumber. A timber log is placed in a saw mill and four longitudinal "slabbing" cuts are taken. These cuts are located and oriented in such a way that the remaining large central log portion is square or rectangular in shape. As is well known, such portion is referred to as a "cant."

The inventive non-timber board, in fact a number of such boards, are made of a single non-timber cant. Like the boards made from it, the non-timber cant comprises an integral mass of parallel elongate flattened rinds of a grass such as sugarcane or sorghum. The flattened rinds are joined together by adhesive bonding.

The cant is preferably substantially void-free, of substantially constant density throughout its cross-section and has first and second primary surfaces. The flattened rinds are preferably aligned along the length of the cant, and most preferably are substantially planar and in planes which are substantially parallel to the primary surfaces. Of course, different rinds are in different planes, but all planes are preferably parallel to the primary surfaces. The rinds of the cant have ends and edges and the rinds overlap rind ends and rind edges of adjacent rinds, preferably with no voids even along such ends and edges.

A few definitions will help in understanding the descriptions which follow. "Sawed/milled surface" means a surface that has been sawed and/or milled or otherwise mechanically "worked" to improve the surface quality to that of furniture-grade hardwood ready to use.

In the detailed description, a rind is described to have a striated inside surface and a relatively "smooth" outside surface. The term "adjacent" is used to refer to rinds which are in surface-to-surface contact with one another along the striated and smooth surfaces.

BRIEF DESCRIPTION OF THE DRAWINGS

FIGS. 3A and 3B are perspectives of opposite surfaces of sugarcane rinds.

FIG. 4 is a perspective of overlapping rinds.

FIG. 5A and 5B are elevations of a press with rinds therein.

FIG. 6 is an end view of a cant with a cut board.

DETAILED DESCRIPTION OF PREFERRED EMBODIMENTS

Figure 1:
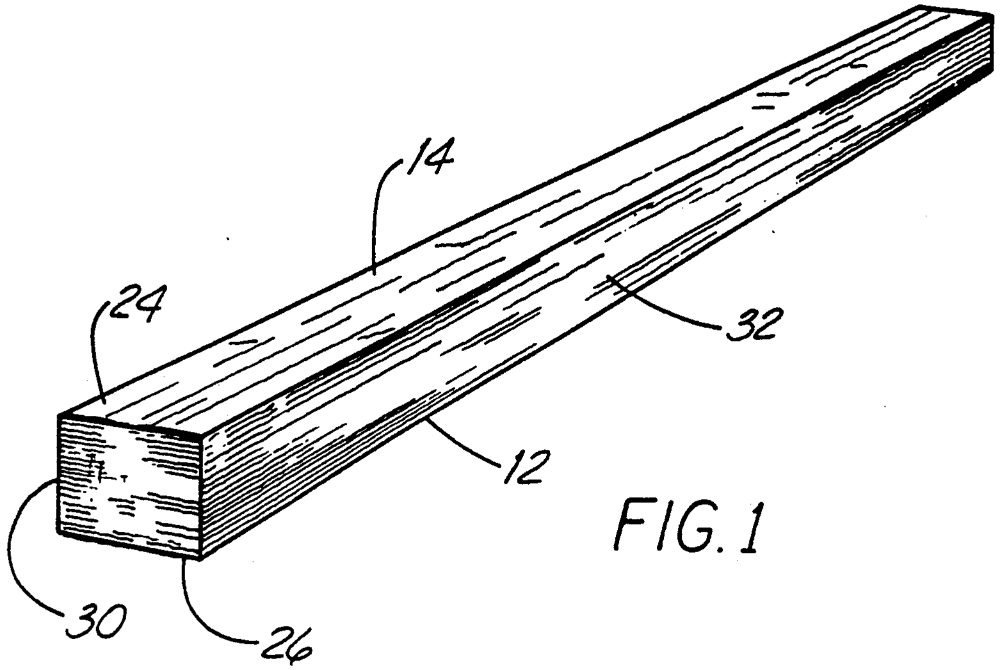
FIG. 1 is a perspective of a non-timber cant in accordance with this invention.

Referring to FIGS. 1-4, the inventive non-timber board 10 and the non-timber cant 12 include half-billet rinds obtained from the Tilby process as described above. The pith removal steps and the subsequent removal of the outer, waxy dermax layer flattens the half-billet rinds and may cause some minor longitudinal rind cracking. However, the rind remains a half-billet rind and does not splinter into smaller pieces.

Rind from the Tilby process is wet and comprises about 55-60% moisture. To ready the rinds for use in making non-timber cants and boards, they are preferably dried to about 10% moisture content. Such drying is preferably without washing since it has been found that there is no need to remove residual sugar from the rind. Indeed, it is believed that the presence of such residual sugar increases the strength of the bond between rinds.

The ready-to-use dried, flattened half-billet rinds 14 are substantially planar, rectangular in shape and preferably have a length as described above, widths in excess of about one inch (2.54 cm) and up to about two inches (5.1 cm) or more, and a thickness on the order of 0.06 inches (about 0.15 cm). Each half-billet rind 14 has a striated surface 16 (i.e., the inside surface of the rind from which the pith has been removed) which has very thin longitudinal grooves between very thin ridges.

Just prior to being deposited in a pile 18 in a press 20 (see FIG. 5A) and compressed (see FIG. 5B), rinds 14 are coated with an adhesive binder. Such binder is preferably a cured thermosetting formaldehyde-based condensation polymer coating each rind to "interconnect" it to adjacent rinds of pile 18. Examples of suitable condensation polymers are phenol-formaldehyde and melamine-formaldehyde. The most highly preferred polymers are water-resistant amino-formaldehyde polymers, such as melamine-formaldehyde. A particularly preferred polymer composition of the latter type has about 60% melamine and 40% formaldehyde.

Cant 12 and board 10 preferably include about 2–10% binder by weight. A range of about 3–5% is preferred and about 4% is highly preferred.

Referring in greater detail to FIGS. 5A and 5B, after depositing rinds 14 to a depth of about 30 inches, with their long axes 22 in alignment with the length of pile 18 and oriented in planes generally horizontal. Pile 18 is compressed to a depth of about 6 inches, using rind-contact pressures on the order of 300 psi. After completion of curing, during which compression is maintained, a completed cant 12 as shown in FIG. 1 is removed from press 20.

Applied pressures may be on the order of 200–600 psi, with about 250–500 psi preferred. Minor differences in the extent of dimensional compression will occur based on significant changes of compression.

The orientation and alignment of rinds 14 with respect to cant 12 and board 10 may be understood by more detailed reference to the drawings. Cant 12 is said to have first and second primary surfaces 24 and 26, which are those surfaces parallel to the surfaces of platen 28 of press 20. Cant 12 also has first and second secondary surfaces 30 and 32, which are normal to primary surfaces 24 and 26 and extend along the length of cant 12.

Boards 10 which are made from cant 12 are said to have first and second principal surfaces 34 and 36 which, like primary surfaces 24 and 26, are parallel to platen 28 when cant 12 is in press 20. First and second side surfaces 38 and 40 of board 10 are normal to principal surfaces 34 and 36 and extend along the length of board 10.

It is to be appreciated that any board surface parallel to a primary surface 24 or 26 of its "parent" cant 12 (and therefore parallel to platen 28 during manufacture) is defined as a principal surface. This is the case irrespective of whether such surface is coincident with either of cant primary surfaces 24 or 26 or is a sawed surface parallel to but between primary surfaces 24 and 26. Such definitions apply irrespective of the relative dimensions of the principal surfaces and side surfaces.

An important advantage of this invention is that each of the surfaces of board 10 closely resembles its counterpart surfaces of fine hardwood lumber. More specifically, principal surfaces 34 and 36 closely resemble flat-grain surfaces of fine hardwood lumber. Side surfaces 38 and 40 closely resemble the edge-grain surfaces of such lumber, such appearance being achieved by virtue of the cut exposed rind edges which form side surfaces 38 and 40. Furthermore, ends 42 and 44 of board 10 closely resemble the end-grain surfaces of fine hardwood lumber. All such surfaces are sufficiently similar in appearance to fine hardwood lumber that any differences are difficult to detect visually.

This fact has important economic implications since hardwood lumber is very expensive, and the most expensive applications are often prohibitively expensive. For example, edge-grain cut wood flooring, which is regarded as a highly desirable commodity, may cost up to several times more than flat-grain cut wood flooring. In the invention, a variety of grain cut products are readily available by mere proper orientation of the saw cut.

As shown in FIG. 4, rinds 14 are shown to be deposited so that the rind ends 46 and rind edges 48 overlap rind ends 46 and rind edges 48 of adjacent rinds 14. Such end and edge overlap is preferred to help prevent voids. And the resulting cant 12 and boards 10 will be stronger than if rinds 14 do not overlap.

Cant 12 and board 10 have a generally uniform cross-sectional density ranging from about 40 pounds per cubic foot to about 60 pounds per cubic foot, depending primarily upon the applied pressure during manufacture. A cant and board having a density of about 50 pounds per cubic foot has about the same hardness as maple, a common wood used in furniture-making.

A preferred cant is rectangular in cross-section and has cross-sectional dimensions of about 6 inches by 6 inches or 6 inches by 8 inches. However, it is to be understood that cants of other cross-sectional shapes and/or having other cross-sectional dimensions are contemplated by the invention.

Figure 2:
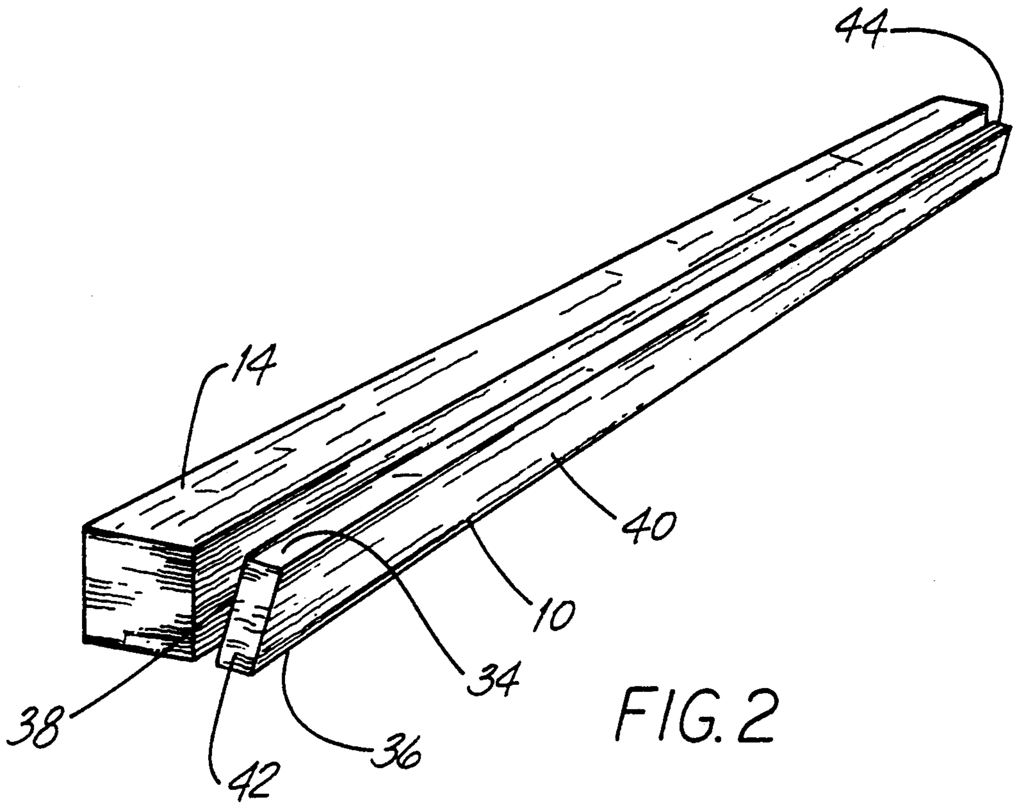
FIG. 2 is a similar perspective with sawed board.

First and second primary surfaces 24 and 26 of cant 12 are quite smooth and in many instances suitable for use "as is" in exposed applications. However, first and second secondary surfaces 30 and 32 are usually somewhat irregular and it may be necessary to make "slabbing" cuts as shown in FIG. 2 to create a smooth surface.

Figure 7:
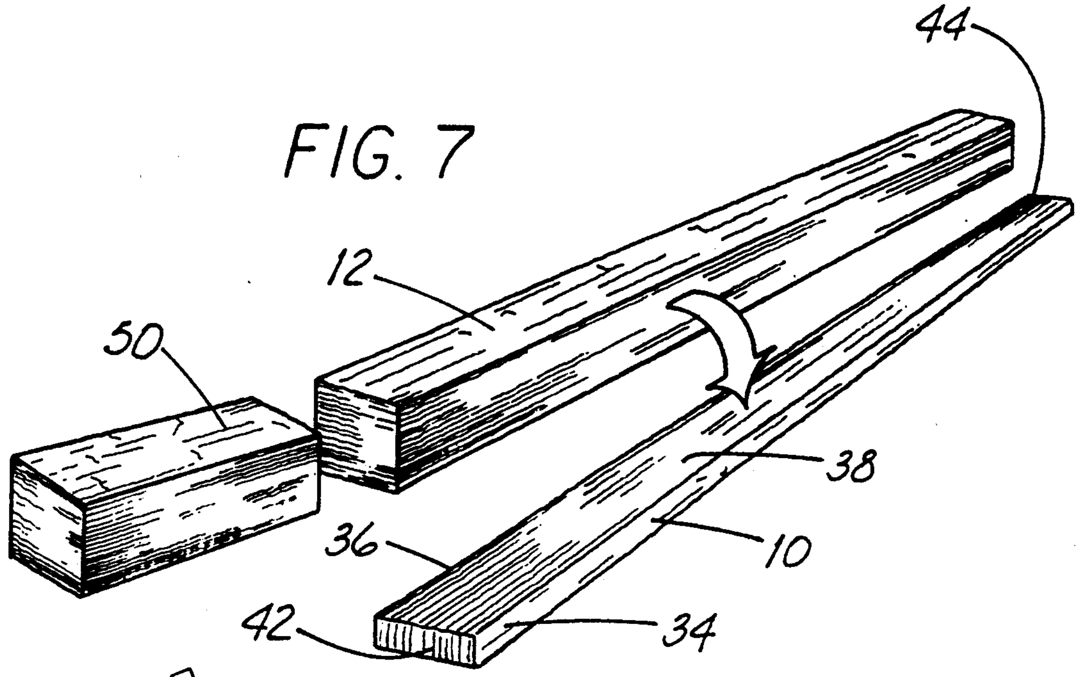
FIG. 7 is a cant with a cut stock and board.

FIG. 7 shows board 10 sawed from cant 12 and FIG. 6 shows, in dashed outline, exemplary locations of saw cuts used to make other boards. Recently, saws have been developed which produce a relatively smooth, high quality cut surface finish. For certain applications, sawing may be all that is required to obtain a usable board. On the other hand, an even better surface finish will result if the board is milled and/or sanded.

Suitably dimensioned boards can be bent into architectural or other shapes without fracturing.

Figure 8:
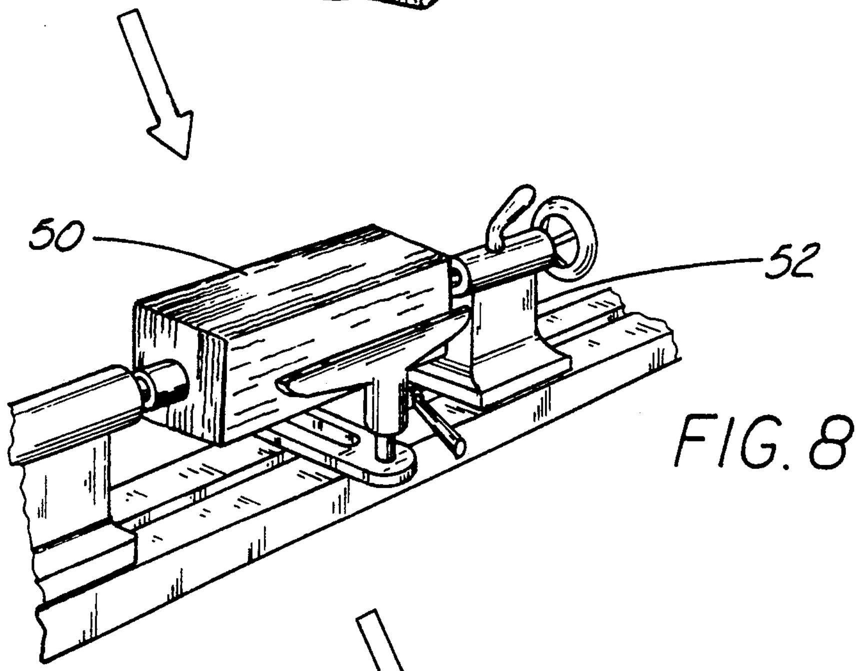
FIG. 8 is a perspective of stock in a wood lathe.
Figure 9:
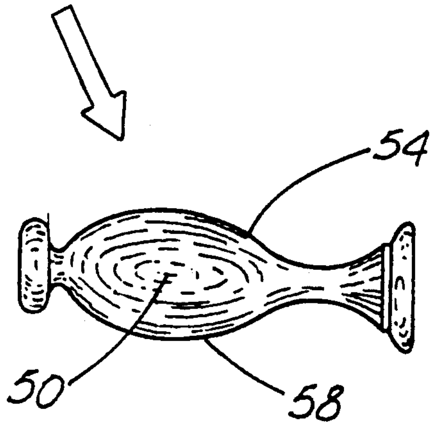
FIG. 9 is a side view of a turned ornamental object.

As useful and unique as they are, boards are not the only product which can be made from cant 12. As shown in FIGS. 7–9, a relatively short length of stock 50 is cut from cant 12, placed in a wood lathe 52 and turned to formed an ornate object 54. Object 54 exhibits flat-grain 56 and edge-grain 58 visual characteristics very closely similar to those of an object turned from a solid block of hardwood. The fact that lathe-turned objects having highly acceptable surface qualities can be made from a board of non-timber lumber or a non-timber cant further attests to the value of the invention.

While the principles of this invention have been described in connection with specific embodiments, it should be understood clearly that these descriptions are made only by way of example and are not intended to limit the scope of the invention.

I claim:

1. A board of non-timber hardwood-replacement lumber having first and second parallel principal surfaces and first and second side surfaces extending along its length, and first and second ends, and comprising:

an integral mass of substantially planar elongate flattened rinds, substantially all parallel to the principal surfaces and extending lengthwise along the length of the board, of a grass selected from the group of grasses consisting of sugarcane and sorghum, said flattened rinds joined together by adhesive bonding; each of the rinds having rind ends and rind edges, and each of the rinds overlapping the rind edges and the rind ends of the rinds which are in face-to-face contact therewith; and at least two of the four principal and side surfaces, including at least one of the two principal surfaces, being sawed/milled surfaces;

thereby providing lumber which is substantially void-free and of substantially constant density throughout its cross-section.

2. The board of claim 1 wherein at least three of the four principal and side surfaces are sawed/milled.

3. The board of claim 1 wherein the flattened rinds are half-billet rinds.

4. The board of claim 3 wherein at least three of the four principal and side surfaces are sawed/milled.

5. A non-timber cant for making boards of hardwood-replacement lumber, said cant being elongate along a first direction and comprising an integral mass of substantially planar elongate flattened rinds, substantially all parallel to one another and extending lengthwise along the first direction, of a grass selected from the group of grasses consisting of sugarcane and sorghum, said flattened rinds joined together by adhesive bonding, each of the rinds having rind ends and rind edges, and each of the rinds overlapping the rind edges and the rind ends of the rinds which are in face-to-face contact therewith, thereby providing a cant which is substantially void-free and of substantially constant density throughout its cross-section.

6. The cant of claim 5 having primary surfaces and secondary surfaces and wherein each of the flattened rinds is in a plane parallel to the primary surfaces.

7. The cant of claim 5 wherein the flattened rinds are half-billet rinds.

* * * * *